United States Patent [19]

Wu

[11] Patent Number: 5,953,460
[45] Date of Patent: Sep. 14, 1999

[54] IMAGE ENCODING METHOD AND AN IMAGE ENCODER WHEREIN A ONE-DIMENSIONAL SIGNAL HAVING THE FASTEST ENERGY CONVERSION RATE IS SELECTED AND OUTPUTTED AS A CODED SIGNAL

[75] Inventor: Zhixiong Wu, Tokyo, Japan

[73] Assignee: Oki Electric Industry Co., Ltd., Tokyo, Japan

[21] Appl. No.: 08/804,514

[22] Filed: Feb. 21, 1997

[30] Foreign Application Priority Data

Mar. 22, 1996 [JP] Japan ................................. 8-066047

[51] Int. Cl.[6] ........................................... G06T 9/00
[52] U.S. Cl. .......................... 382/239; 382/234; 382/248; 382/251; 358/432; 358/433; 348/408; 348/411
[58] Field of Search .................................... 382/234, 239, 382/244, 248, 286, 304, 251, 250; 358/432, 433, 408, 411

[56] References Cited

U.S. PATENT DOCUMENTS

| 4,691,329 | 9/1987 | Juri et al. ................................. 375/240 |
| 5,063,608 | 11/1991 | Siegel ....................................... 382/239 |
| 5,068,724 | 11/1991 | Krause et al. ........................... 348/402 |
| 5,412,741 | 5/1995 | Shapiro .................................... 382/232 |
| 5,583,657 | 12/1996 | Jeong ....................................... 358/432 |
| 5,657,085 | 8/1997 | Katto ....................................... 348/398 |
| 5,751,358 | 5/1998 | Suzuki et al. ........................... 348/405 |
| 5,754,696 | 5/1998 | Eom et al. .......................... 395/200.77 |
| 5,754,793 | 5/1998 | Miyashita et al. ...................... 382/232 |

FOREIGN PATENT DOCUMENTS

| 0 417 739 | 3/1991 | European Pat. Off. . |
| 0 442 096 | 8/1991 | European Pat. Off. . |
| 0 561 593 | 9/1993 | European Pat. Off. . |
| 0561593A2 | 9/1993 | European Pat. Off. . |

OTHER PUBLICATIONS

Feng Zou et al., "Maximum Energy Principle of Multiple Transforms in Data Compression", Transactions on Signal Processing, Dec. 1995, pp. 3036–3039.

Thomas Wiegand et al., "Efficient Mode Selection for Block–Based Motion Compensated Video Coding", Oct. 1995, pp. 559–562.

Zhixiong Wu et al., "Block–based DCT and wavelet selective coding for arbitrary–shaped images", Visual Communications and Image Processing '97, Feb. 1997, pp. 658–665.

International Telecommunication Union, Line Transmission of Non–Telephone Signals, Video Codec for Audio–visual Services at p×64 kbits, Telecommunication Standardization Sector of ITU, pp. 1–25, Mar. 1993.

U.S. Patent Application Ser. No. 08/425,990, filed Apr. 20, 1995, Shiu GO—pending.

U.S. Patent Application Ser. No. 08/548,943, filed Oct. 26, 1995, Shiu GO—pending.

H. Yasuda, MPEG/International Standard for Multimedia Coding, Maruzen, Sep. 30, 1994, pp. 60–75.

Zou, Feng et al., "Maximum Energy Principle of Multiple Transforms in Data Compression", 1995, pp. 3036–3039.

*Primary Examiner*—Edward L. Coles
*Assistant Examiner*—David Rosenblum
*Attorney, Agent, or Firm*—Venable; Robert J. Frank

[57] ABSTRACT

An image signal is transformed by at least two different mathematical transformations to obtain at least two different transformed signals. A selected one of the transformed signals is quantized and coded, the selection being made so as to minimize the size of the coded data. The selection is made by comparing the energy convergence rates of the transformed signals, or by quantizing all of the transformed signals and comparing the amounts of non-zero quantized data, or by quantizing and coding all of the transformed signals and comparing the coded data sizes directly.

10 Claims, 5 Drawing Sheets

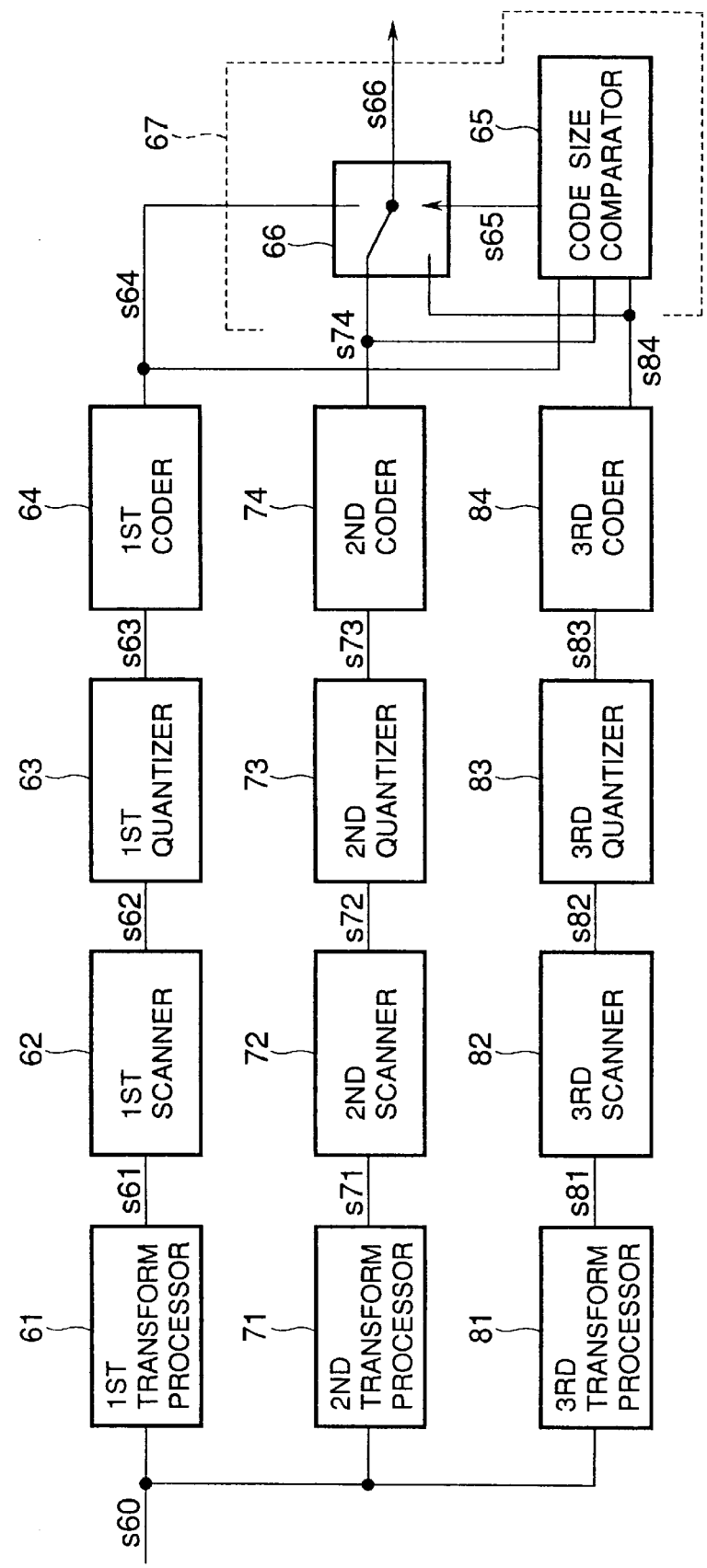

IMAGE ENCODING METHOD AND AN IMAGE ENCODER WHEREIN A ONE-DIMENSIONAL SIGNAL HAVING THE FASTEST ENERGY CONVERSION RATE IS SELECTED AND OUTPUTTED AS A CODED SIGNAL

BACKGROUND OF THE INVENTION

The present invention relates to an image encoder for encoding an image signal such as a digitized still-image signal or a differential image signal representing the difference between two frames in a moving image.

Conventional image encoders begin by performing a two-dimensional mathematical transformation such as a discrete cosine transform or a wavelet transform on the image signal. The transformed data are next rearranged in a one-dimensional sequence and quantized according to a certain quantizing rule. The quantized data are then coded by a suitable method such as an entropy coding method. As a result, the input image signal is usually compressed to a fraction of its original size.

One objective in image encoding is to achieve the maximum compression ratio. The key to attaining this objective is to have the mathematical transformation encode the image information in a relatively small number of non-zero values, or more precisely, in a relatively small number of values that will be quantized to non-zero values. Unfortunately, no single mathematical transformation works well for all images. Since the discrete cosine transform employs the cosine function, it succeeds excellently for image signals that vary in a periodic manner, but has less success with image signals in which sharp transitions (edges) appear at arbitrary locations. The wavelet transform is good at handling edges, but is less successful in dealing with periodic signals.

Conventional image encoders thus yield high compression ratios for some image signals and low compression ratios for other image signals. As a result, the average compression ratio falls far short of the desired maximum.

SUMMARY OF THE INVENTION

It is accordingly an object of the present invention to improve the compression ratio of an image encoder.

Another object is to encode different types of image signals with a high compression ratio.

In the invented image encoding method, an image signal is transformed by at least two different mathematical transformations to obtain at least two different transformed signals. These transformed signals are separately reordered to obtain respective one-dimensional signals.

According to a first aspect of the invention, the one-dimensional signals are respectively quantized and coded to obtain at least two coded signals. The coded signal with the smallest code size is then selected and output.

According to a second aspect of the invention, the one-dimensional signals are respectively quantized, and the amounts of non-zero data in the resulting quantized signals are compared. The quantized signal with the least amount of non-zero data is selected, coded, and output.

According to a third aspect of the invention, the energy convergence rates of the one-dimensional signals are compared. The one-dimensional signal with the fastest energy convergence rate is selected, quantized, coded, and output.

BRIEF DESCRIPTION OF THE DRAWINGS

In the attached drawings:

FIG. 5 is a block diagram of a fourth embodiment of the invention.

DETAILED DESCRIPTION OF THE INVENTION

Embodiments of the invention will be described with reference to the attached illustrative drawings.

Figure 1:
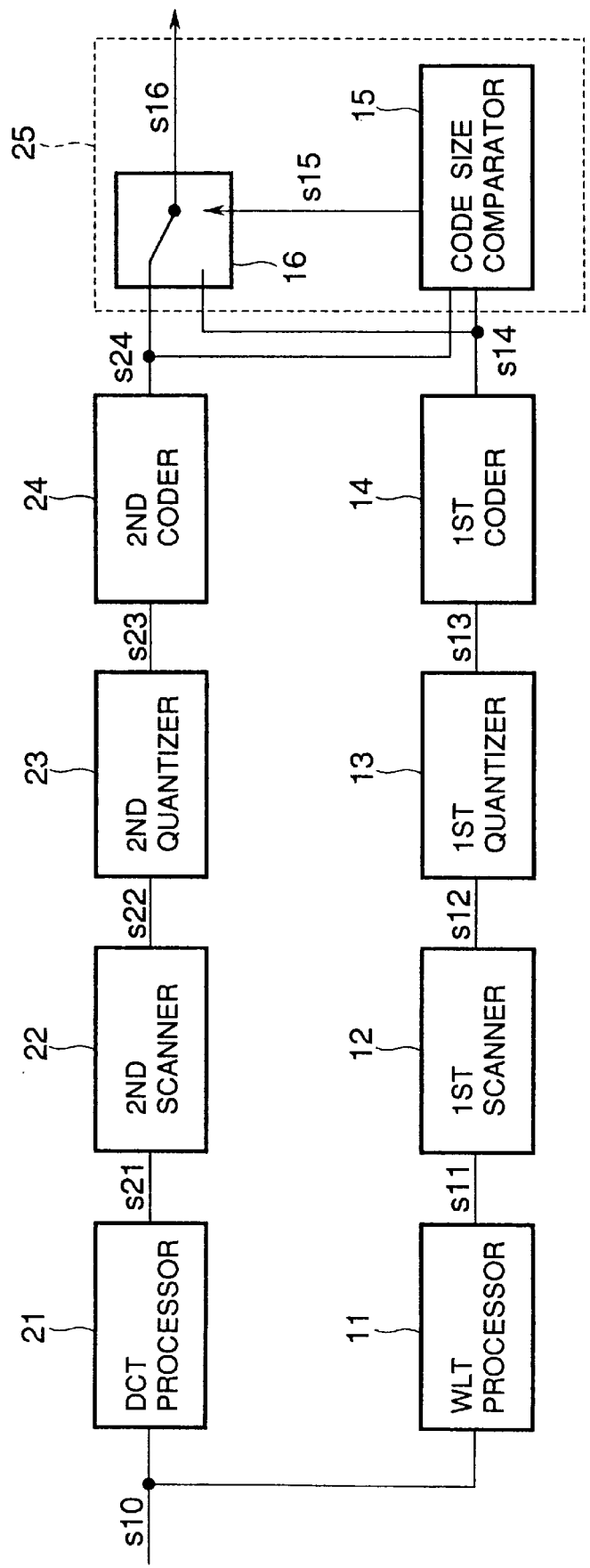
FIG. 1 is a block diagram of a first embodiment of the invention.

Referring to FIG. 1, a first embodiment of the invention comprises a wavelet transform (WLT) processor 11, a first scanner 12, a first quantizer 13, a first coder 14, a code size comparator 15, a switch 16, a discrete cosine transform (DCT) processor 21, a second scanner 22, a second quantizer 23, and a second coder 24. The code size comparator 15 and switch 16 constitute a coded signal selector 25. These elements comprise well-known computational and memory circuits, detailed descriptions of which will be omitted to avoid obscuring the invention with irrelevant detail. The elements are interconnected as shown, and operate as follows.

An image signal s10 representing a two-dimensional image is input to the wavelet transform processor 11 and discrete cosine transform processor 21. Both processors 11 and 21 divide the input image into two-dimensional blocks of picture elements (pixels), and transform each block separately. The block sizes employed by the two processors may differ.

The wavelet transform employs a low-pass filter h(k) and a high-pass filter g(k) having respective Fourier transforms $H(\omega)$ and $G(\omega)$ that satisfy the following conditions ($\omega$ is a variable representing frequency).

$$|H(0)|=1$$

$$|H(\omega)|^2+|G(\omega+\pi)|^2=1$$

The wavelet transform is carried out in successive stages, high-pass and low-pass spatial filtering being performed in each stage. The output of each stage comprises four components, representing different combinations of high and low horizontal and vertical spatial frequencies. If $S_{(i-1)}(j, k)$ and $S_i(j, k)$ denote the input and output of the i-th stage, additional subscripts H and L denote high and low, and an asterisk (*) denotes the mathematical convolution operation, the four components can be described by the following formulas.

$$S_{LLi}(j/2, k/2)=S_{LL(i-1)}(j, k)*h(j)*h(k)$$

$$S_{LHi}(j/2, k/2)=S_{LL(i-1)}(j, k)*h(j)*g(k)$$

$$S_{HLi}(j/2, k/2)=S_{LL(i-1)}(j, k)*g(j)*h(k)$$

$$S_{HLi}(j/2, k/2)=S_{LL(i-1)}(j, k)*g(j)*g(k)$$

The notation (j/2, k/2) indicates that the output of each stage is scaled down by a factor of two in the horizontal and vertical directions. Equivalently, the cut-off frequency separating high-frequency components from low-frequency components is reduced by a factor of two in each stage. $S_{LL0}(j, k)$ is the input image signal s10.

Figure 2:
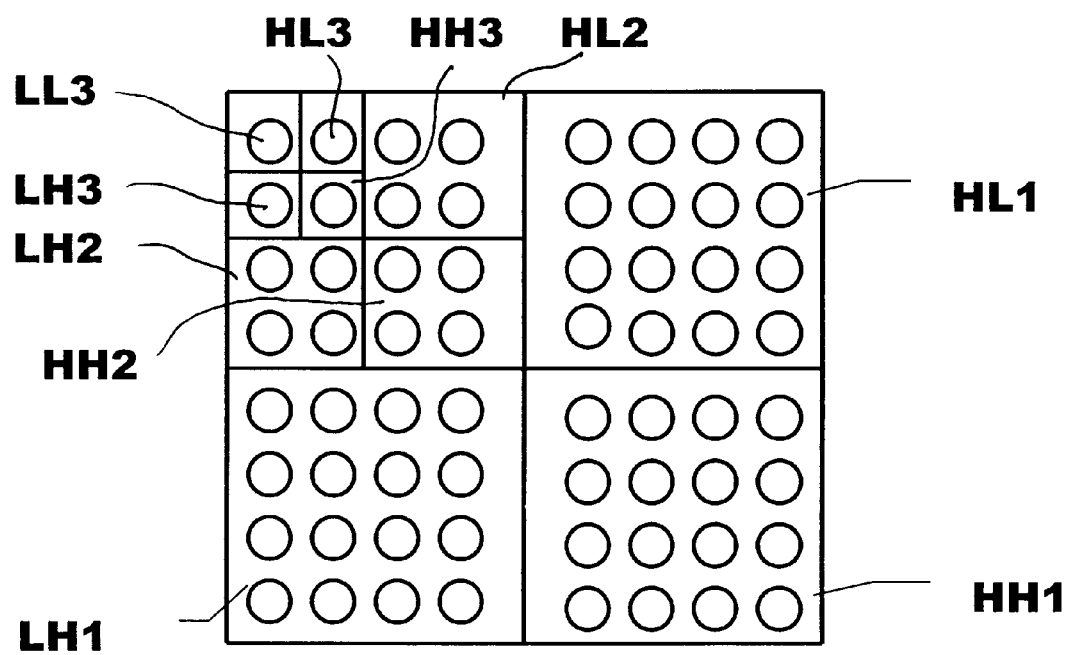
FIG. 2 illustrates the output of a wavelet transform.

The wavelet transform is illustrated in FIG. 2 for the case of an 8×8 block. The symbol HL1, for example, denotes the data $S_{HL1}(j/2, k/2)$ given by the formula above. The result of this wavelet transform is a first transformed signal s11 comprising a two-dimensional array of sixty-four transformed data values for each 8×8 block of input image pixels. Each transformed data value is indicated by one block dot in FIG. 2.

Each two-dimensional array is provided to the first scanner 12, which reorders the data in the sequence shown in Table 1 to obtain a first one-dimensional signal s12.

TABLE 1

| WLT Data Scanning Order | | | | | | | |
|---|---|---|---|---|---|---|---|
| 0 | 1 | 4 | 6 | 16 | 20 | 24 | 28 |
| 2 | 3 | 5 | 7 | 17 | 21 | 25 | 29 |
| 8 | 9 | 12 | 13 | 18 | 22 | 26 | 30 |
| 10 | 11 | 14 | 15 | 19 | 23 | 27 | 31 |
| 32 | 33 | 34 | 35 | 48 | 49 | 53 | 54 |
| 36 | 37 | 38 | 39 | 50 | 52 | 55 | 60 |
| 40 | 41 | 42 | 43 | 51 | 56 | 59 | 61 |
| 44 | 45 | 46 | 47 | 57 | 58 | 62 | 63 |

The first one-dimensional signal s12 output by the first scanner 12 is quantized by the first quantizer 13 to produce a first quantized signal s13. Quantization simply means that a range of possible signal values are mapped onto a single quantized value. The quantization rule can be described by a quantizing table stored in the first quantizer 13, or by one or more mathematical formulas.

The first quantized signal s14 is coded by the first coder 14. The coding scheme employs, for example, variable-length codewords, each representing a run of zeros followed by one non-zero quantized value. A coding scheme of this type can be described in terms of a coding table. The resulting first coded signal s14 is output to the coded signal selector 25.

The discrete cosine transform processor 21 transforms the same image signal s10 by the formula given below, which converts an n×n block of pixel values into an n×n block of coefficients F(u, v). The block-size parameter n is a positive integer such as eight.

$$F(u, v) = \frac{2}{n} \sum_{j=0}^{n-1} \sum_{k=0}^{n-1} x(j, k) \cos\frac{(2j+1)u\pi}{2n} \cos\frac{(2k+1)v\pi}{2n}$$

The resulting coefficients F(u, v) form a two-dimensional array, u denoting the horizontal dimension and v the vertical dimension. These two-dimensional arrays are output as a second transformed signal s21 to the second scanner 22, which reorders the coefficients in the zig-zag sequence indicated by Table 2 to obtain a second one-dimensional signal s22.

TABLE 2

| DCT Data Scanning Order | | | | | | | |
|---|---|---|---|---|---|---|---|
| 0 | 1 | 5 | 6 | 14 | 15 | 27 | 28 |
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |

TABLE 2-continued

| DCT Data Scanning Order | | | | | | | |
|---|---|---|---|---|---|---|---|
| 21 | 34 | 37 | 47 | 50 | 56 | 59 | 61 |
| 35 | 36 | 48 | 49 | 57 | 58 | 62 | 63 |

The second quantizer 23 quantizes the second one-dimensional signal s22 to obtain quantized coefficients QF(u, v). The second quantizer 23 uses one pair of quantizing formulas for still images, and another pair of quantizing formulas for differential images. In a moving image, the first pair of formulas is used for intra-frames, and the second pair for inter-frames. Each pair of formulas has a parameter q denoting the quantization step size. The first pair of formulas, used for still images and intra-frames, is as follows.

$QF(0, 0)=[F(0, 0)+4]/8$ $QF(u, v)=F(u, v)/(2\times q)$, if $(u, v)\neq(0, 0)$

The formulas used for differential images (inter-frames) are as follows.

$QF(u, v)=[F(u, v)-q/2]/(2\times q)$, if $F(u, v)\geq 0$ $QF(u, v)=[F(u, v)+q/2]/(2\times q)$, if $F(u, v)<0$ The quantized coefficient data QF(u, v) constitute the second quantized signal s23 output from the second quantizer 23 to the second coder 24. The second coder 24 codes this signal by a method similar to that employed in the first coder 14, for example, although not necessarily with the same coding table, and supplies the resulting second coded signal s24 to the coded signal selector 25.

In the coded signal selector 25, the code size comparator 15 compares the total code size of the two coded signals s14 and s24, selects the coded signal with the smaller code size, and sends the switch 16 a control signal s15 commanding the switch 16 to output the selected signal. In FIG. 1, the selected signal s16 is the second coded signal s24.

By using two different mathematical transformations and selecting the coded signal with the smaller code size, the first embodiment is able to obtain a high compression ratio for a wide variety of input image signals. The average compression performance of the first embodiment is thus considerably better than the compression performance of an image coder of the conventional type, which is limited to a single mathematical transformation.

The use of independent quantizers 13 and 23 and independent coders 14 and 24 for the signals resulting from the two mathematical transformations allows each transformed signal to be quantized and coded by a method best suited to the particular transformation employed. The first and second coders 14 and 24 can employ different coding tables, as noted above, or can employ entirely different coding methods. Similarly, the first and second quantizers 13 and 23 can employ different quantizing tables, or different quantizing methods.

Figure 3:
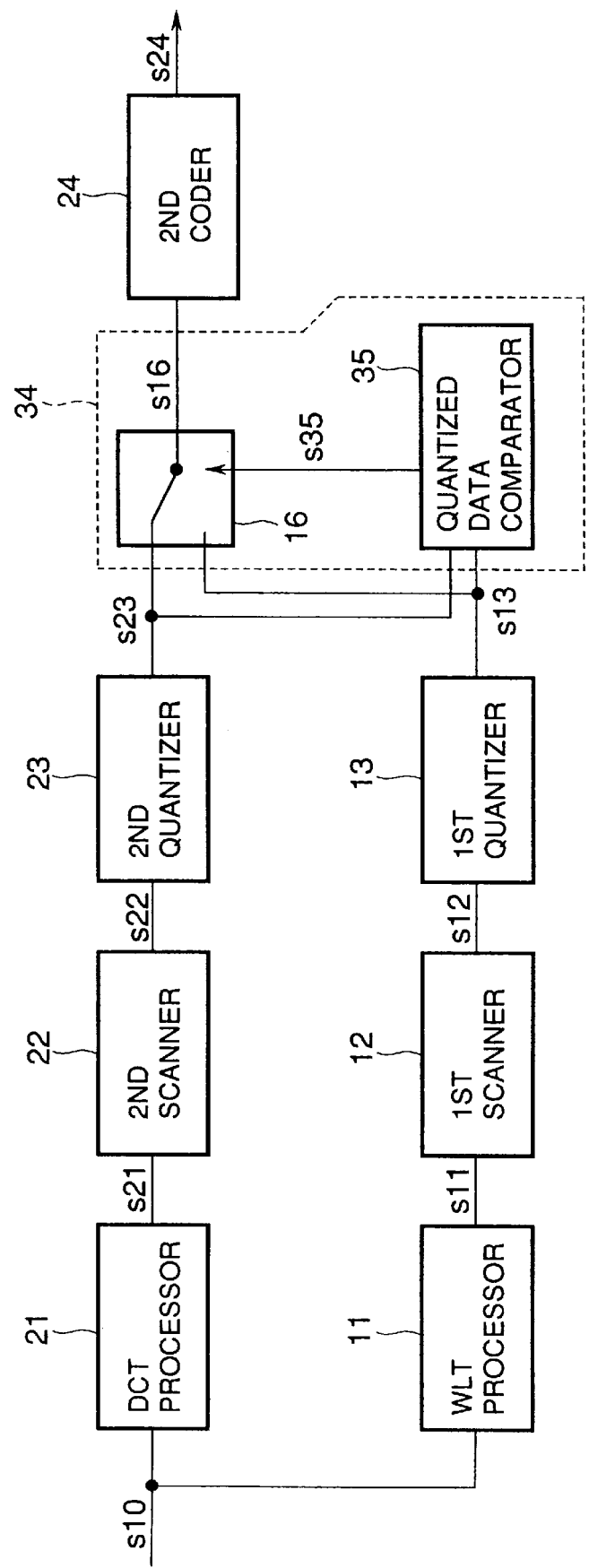
FIG. 3 is a block diagram of a second embodiment of the invention.

FIG. 3 shows a second embodiment of the invention, using the same reference numerals as in FIG. 1 for equivalent elements. Descriptions of these elements will be omitted. The coder 24 in FIG. 3 is equivalent to both the first and second coders 14 and 24 in FIG. 1.

The main difference between the first and second embodiments is that the coded signal selector 25 of the first embodiment is replaced in the second embodiment by a quantized signal selector 34, which is disposed between the first and second quantizers 13 and 23 and the coder 24. The quantized signal selector 34 comprises a switch 16 and a quantized data comparator 35, which select one of the two quantized signals s13 and s23 output by the first and second quantizers 13 and 23, and supply the selected quantized signal s16 to the coder 24.

The quantized data comparator 35 operates by counting the number of non-zero data values in the first and second quantized signals s13 and s23, and selecting the quantized signal with the least amount of non-zero data. A control signal s35 from the quantized data comparator 35 commands the switch 16 to supply the selected quantized signal to the coder 24.

The other elements in the second embodiment operate as in the first embodiment.

The amount of non-zero data in the quantized signals predicts the size of the coded data with good accuracy, so the second embodiment provides substantially the same effect as the first embodiment, while requiring only one coder instead of two. The second embodiment is advantageous when the same coding method and coding table are employed for the quantized data resulting from both mathematical transformations.

Figure 4:
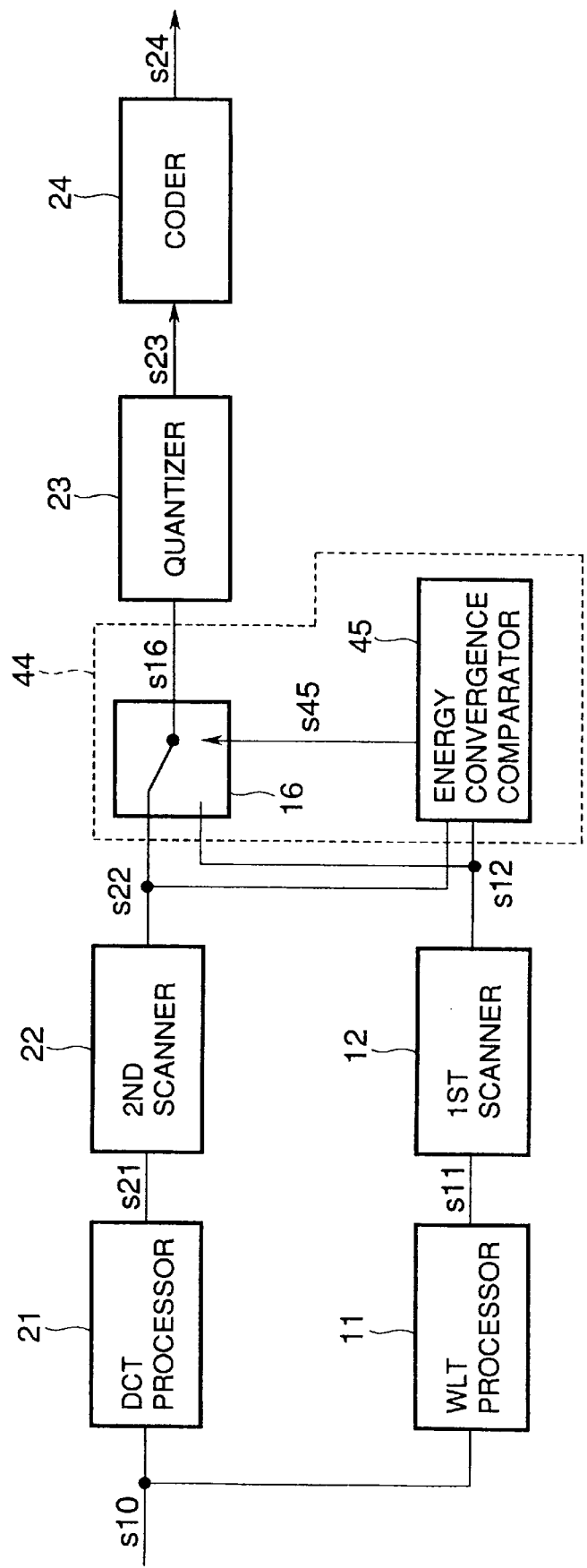
FIG. 4 is a block diagram of a third embodiment of the invention.

FIG. 4 shows a third embodiment of the invention, using the same reference numerals as in FIG. 3 for equivalent elements. Descriptions of these elements will be omitted. The quantizer 23 in FIG. 4 is equivalent to both the first and second quantizers 13 and 23 in FIG. 3.

The main difference between the second and third embodiments is that the quantized signal selector 34 of the second embodiment is replaced in the third embodiment by a transformed signal selector 44, which is disposed between the first and second scanners 12 and 22 and the quantizer 23. The transformed signal selector 44 comprises a switch 16 and an energy convergence comparator 45, which select one of the two one-dimensional signals s12 and s22 output by the first and second scanners 12 and 22, and supply the selected one-dimensional signal s16 to the quantizer 23.

The energy convergence comparator 45 operates by comparing the rate of convergence of energy in the two one-dimensional signals s12 and s22. Specifically, the energy convergence comparator 45 arranges the transformed data in each one-dimensional signal in decreasing order of absolute value, then calculates a cumulative sum of squares in each one-dimensional signal and determines which sum converges more rapidly toward its final total value. A control signal s45 from the energy convergence comparator 45 commands the switch 16 to supply the one-dimensional signal with the faster energy convergence rate to the coder 24.

The other elements in the third embodiment operate as in the second embodiment.

The rate of energy convergence is a good indicator of the amount of non-zero data that will be present after quantization. The third embodiment thus provides substantially the same effect as the second embodiment, while requiring only one quantizer instead of two. The third embodiment is advantageous when the same quantizing and coding methods and tables are employed for the transformed data resulting from both mathematical transformations.

FIG. 5 shows a fourth embodiment of the invention, which is generally similar to the first embodiment but employs three different mathematical transformations. For example, the discrete cosine transform and two different types of wavelet transforms can be employed. One type of wavelet transform is the transform described in the first embodiment. The other type replaces the various high-frequency components with edge information, detected by comparing differences between adjacent pixel values.

These three particular mathematical transformations are just one example, however. Any three different mathematical transformations can be employed.

The first mathematical transformation is performed by a first transform processor 61, and the transformed data are further processed by a first scanner 62, a first quantizer 63, and a first coder 64. These elements output respective signals s61, s62, s63, and s64. The first coded signal s64 is supplied to a code size comparator 65 and switch 66, which constitute a coded signal selector 67.

The second mathematical transformation is performed by a second transform processor 71, and the transformed data are further processed by a second scanner 72, a second quantizer 73, and a second coder 74. These elements output respective signals s71, s72, s73, and s74. The second coded signal s74 is supplied to the code size comparator 65 and switch 66.

The third mathematical transformation is performed by a third transform processor 81, and the transformed data are further processed by a third scanner 82, a third quantizer 83, and a third coder 84. These elements output respective signals s81, s82, s83, and s84. The third coded signal s84 is supplied to the code size comparator 65 and switch 66.

The code size comparator 65 compares the three coded signals s64, s74, and s84, selects the coded signal with the smallest code size, and sends a command signal s65 to the switch 66, causing the switch 66 to output the selected coded signal. In the drawing, the second coded signal s74 becomes the selected coded signal s66.

The fourth embodiment has generally the same effect as the first embodiment, but achieves still better average compression performance, by selecting from among signals produced by three different mathematical transformations.

The number of mathematical transformations is not limited to two or three. In general N different mathematical transformations may be performed, and a selection made among the N resulting coded signals, where N is any number greater than unity.

The second and third embodiments can also be modified by increasing the number of mathematical transformations. Hybrid versions of these embodiments are furthermore possible. For example, a selection between first and second transformed signals can be made on the basis of energy convergence rate, and the selected signal can be quantized and coded by one method while a third transformed signal is being quantized and coded by another method; then the code sizes of the two coded signals can be compared and the smaller coded signal selected for output.

The mathematical transformations need not all be two-dimensional block transformations. Some or all of the transformations may operate on the image as a whole, instead of on n×n blocks of pixels.

If the mathematical transformations are all two-dimensional block transformations, however, and if the block sizes are all the same, the code size comparator, quantized data comparator, or energy convergence comparator can generate a separate control signal for each block. In other cases, control signals are output per larger units, e.g. one control signal per image.

The invented image encoder need not comprise separate circuits as shown in the embodiments above. The various transform processors, for example, may be combined into a single processor that performs the necessary mathematical transformations one after another. This processor may also be adapted to carry out the scanning, quantizing, coding, and comparing operations performed by the other elements in the embodiments.

Those skilled in the art will recognize that further modifications are possible within the scope claimed below.

What is claimed is:

1. A method of encoding an image signal, comprising the steps of:

performing a plurality of different mathematical transformations on said image signal, thereby obtaining a plurality of transformed signals;

reordering said transformed signals to obtain respective one-dimensional signals; and selecting, quantizing, and coding one of said one-dimensional signals to obtain a coded signal, and outputting said coded signal, said step of selecting, quantizing, and coding comprising the further steps of:

comparing energy convergence rates of said one-dimensional signals; and selecting from among said one-dimensional signals a one-dimensional signal with a fastest energy convergence rate.

2. The method of claim 1, wherein said step of comparing energy convergence rates comprises the further steps of calculating cumulative sums of squares in respective one-dimensional signals; and comparing said cumulative sums of squares.

3. The method of claim 1, wherein said mathematical transformations are two-dimensional block transformations.

4. The method of claim 3, wherein one of said mathematical transformations is a wavelet transform.

5. The method of claim 4, wherein another one of said mathematical transformations is a discrete cosine transform.

6. An image encoder for encoding an image signal, comprising:

a plurality of transform processors for performing different mathematical transformations on said image signal in parallel, thereby obtaining a plurality of transformed signals;

a like plurality of scanners coupled to respective transform processors, for reordering said transformed signals to obtain respective one-dimensional signals;

a transformed signal selector coupled to said scanners, for comparing rates of convergence of energy in said one-dimensional signals, and selecting a one-dimensional signal with a fastest rate of convergence of energy;

a quantizer coupled to said transformed signal selector, for quantizing the one-dimensional signal selected by said transformed signal selector to obtain a quantized signal; and a coder coupled to said quantizer, for coding said quantized signal to obtain a coded signal, and outputting said coded signal.

7. The image encoder of claim 6, wherein said transformed signal selector compares cumulative sums of squares of said one-dimensional signals.

8. The image encoder of claim 6, wherein said transform processors divide said image signal into blocks and perform two-dimensional mathematical transformations on said blocks.

9. The image encoder of claim 8, wherein one of said transform processors performs a wavelet transform.

10. The image encoder of claim 9, wherein another one of said transform processors performs a discrete cosine transform.

* * * * *